(12) United States Patent
Parker

(10) Patent No.: US 7,121,570 B2
(45) Date of Patent: Oct. 17, 2006

(54) REAR SUSPENSION FOR A MOTORCYCLE

(76) Inventor: James G. Parker, 229 Anita Pl., Santa Fe, NM (US) 87505-8805

( * ) Notice: Subject to any disclaimer, the term of this patent is extended or adjusted under 35 U.S.C. 154(b) by 0 days.

(21) Appl. No.: 11/026,819

(22) Filed: Dec. 29, 2004

(65) Prior Publication Data

US 2006/0137928 A1  Jun. 29, 2006

(51) Int. Cl.
*B62K 11/00* (2006.01)

(52) U.S. Cl. ..................... 280/285; 280/286
(58) Field of Classification Search ............ 280/275, 280/283, 284, 285, 286; 180/219, 227
See application file for complete search history.

(56) References Cited

U.S. PATENT DOCUMENTS

| | | | |
|---|---|---|---|
| 3,655,016 A * | 4/1972 | Watanabe | 188/181 T |
| 3,817,342 A * | 6/1974 | Hamilton | 180/227 |
| 3,917,313 A * | 11/1975 | Smith et al. | 280/284 |
| 4,058,181 A | 11/1977 | Buell | |
| 4,433,747 A | 2/1984 | Offenstadt | |
| 4,463,824 A | 8/1984 | Boyesen | |
| 4,541,502 A * | 9/1985 | Iwai et al. | 180/217 |
| 4,789,174 A | 12/1988 | Lawwill | |
| 4,821,833 A * | 4/1989 | Yamaguchi | 180/219 |
| 4,889,205 A | 12/1989 | Yoshimi | |
| 4,951,791 A | 8/1990 | Creixelli | |
| 5,007,497 A | 4/1991 | Trema | |
| 5,042,609 A * | 8/1991 | Krispler et al. | 180/219 |
| 5,067,580 A * | 11/1991 | Parker | 180/219 |
| 5,240,087 A | 8/1993 | Parker | |
| 5,282,517 A | 2/1994 | Prince | |
| 5,295,702 A | 3/1994 | Buell | |
| 5,332,246 A | 7/1994 | Buell | |
| 5,452,910 A | 9/1995 | Harris | |
| 5,469,930 A | 11/1995 | Wiers | |
| 6,076,845 A | 6/2000 | Lawwill | |
| 6,102,241 A | 8/2000 | Palazzo | |
| 6,131,934 A | 10/2000 | Sinclair | |
| 6,263,994 B1 | 7/2001 | Eitel | |
| 6,283,487 B1 | 9/2001 | Torre | |

(Continued)

*Primary Examiner*—Lesley D. Morris
*Assistant Examiner*—Daniel Yeagley

(57) ABSTRACT

A rear single-sided swingarm suspension for a motorcycle includes a single-sided swingarm that has an axle bearing assembly pivotably connected to the rearward end thereof for swinging motion in a plane parallel to the plane of travel of the swingarm. A cantilevered wheel axle is journalled in the axle bearing assembly and is affixed to the rear wheel. A control arm, which is shorter than the swingarm, extends generally parallel to the swingarm and is pivotably connected to the motorcycle frame at a point rearward of the forward end of the swingarm. The axle bearing assembly also is pivotably attached to the rear end of the control arm. The wheel axle is journalled in the axle bearing assembly at a point rearward of the rear end of the swing arm and on the opposite side of the swingarm from the control arm. The axle bearing assembly may include an axle housing having a splined tube extending generally parallel to the swingarm, and an upright member having a cooperably splined cylinder which receives the splined tube, so as to allow linear movement and securing of the position of the rear wheel axle with respect to the axis of the swingarm and thereby select the drive chain tension. The suspension results in the path of travel of the wheel axle during swingarm motion being more nearly vertical, thereby better isolating propulsion drive forces on the wheel from weight loads and road shocks.

19 Claims, 6 Drawing Sheets

U.S. PATENT DOCUMENTS 6,527,289 B1  3/2003  Parigian 6,932,178 B1 *  8/2005  Soatti ......................... 180/226

\* cited by examiner

REAR SUSPENSION FOR A MOTORCYCLE

FIELD OF THE INVENTION

The present invention is generally related to motorcycle frames and suspensions. In particular, the present invention is related to rear swingarm suspension systems for motorcycles.

BACKGROUND OF THE INVENTION

Virtually all motorcycles include front and rear suspension systems that allow vertical travel of the wheels relative to the motorcycle body. Wheel travel is controlled by springs and dampers, sometimes collectively referred to as shock absorbers, that function to absorb road shocks while also bearing the weight load of the motorcycle and rider.

A primary goal of motorcycle rear suspension design has been to isolate engine drive forces, transmitted from the engine to the rear wheel, from suspension forces that bear the weight load and road shocks imposed on the rear wheel. One reason for this goal is to eliminate or reduce the tendency of engine drive forces to cause the rear suspension to either extend or compress during acceleration or deceleration. Another reason is to minimize the effect of suspension travel on drive forces, so as to render the drive forces more exclusively controllable by the rider.

One approach to isolating drive forces from suspension forces has been to make the swingarm itself as long as possible. To explain, drive forces propel the motorcycle forward and are essentially horizontal in direction, while suspension forces are largely vertical in direction. A longer swingarm results in the path that the rear wheel travels in response to weight and shock loads being more nearly vertical in direction and thus being better aligned with the suspension forces, while at the same time being more orthogonal to and thus more isolated from the drive forces.

Resorting to a longer swingarm, with nothing more, necessarily increases the overall wheelbase of the motorcycle. Yet for some performance purposes it is desirable that the wheelbase of the motorcycle be as short as possible. Thus, to increase the swingarm length while not increasing the wheelbase, designers have gone to great lengths to shorten the engine in the fore and aft direction, to thereby allow the drive sprocket to be located further forward on the motorcycle. For example, in some recent designs the transmission shafts have been stacked vertically within the transmission housing in order to shorten the engine length, and thus also the wheelbase, by as little as a centimeter.

Along with this approach it has also typically been sought to position the swingarm pivot axis as close as possible to the engine drive sprocket, so as to minimize variations in drive chain tension during swinging of the swingarm. Variations in drive chain tension necessarily result in corresponding variations in the drive forces transmitted through the chain. Thus any design measure that minimizes variations in drive chain tension during suspension travel also serves to better isolate drive forces from suspension forces and thereby renders the drive forces more controllable to the rider.

To attain the foregoing ends there have been a number of designs incorporating a 4-bar linkage, with the motorcycle frame, two swingarms, and a rear axle holder constituting the 4 bars. Such designs have not been generally accepted due to their relative complexity and expense, and as a result the conventional swingarm has been dominant.

Accordingly, it is an object and purpose of the present invention to achieve some of the advantage of a longer swingarm without increasing the wheelbase of a motorcycle.

It is also an object and purpose to achieve the foregoing objects and purposes with a suspension system that allows the chain tension to be adjusted by linear movement of the wheel in a direction generally parallel to the swingarm.

SUMMARY OF THE INVENTION

The present invention provides a rear suspension that connects the rear wheel of a motorcycle to the frame of the motorcycle. The suspension includes a single-sided rear swingarm extending along one side of the wheel, with the forward end of the swingarm being pivotably connected to the motorcycle frame by a swingarm pivot assembly so as to allow limited swinging travel of the swingarm in a vertical plane. In accordance with the invention, an axle bearing assembly extends rearwardly from the rear end of the swingarm and is pivotably connected thereto so as to allow swinging motion of the axle bearing assembly in a plane parallel to the plane of travel of the swingarm.

The invention further includes a control arm that is shorter than the swingarm and which extends generally parallel to the swingarm. The control arm may be located either above or below the swingarm, and in the preferred embodiment is located above the swingarm. The forward end of the control arm is pivotably connected to the frame, or a fixed extension of the frame, at a point rearward of the forward end of the swingarm, and the rearward end of the control arm is pivotably connected to the axle bearing assembly. The axle bearing assembly has journalled therein a wheel axle that extends from the axle bearing assembly in cantilevered fashion and which is affixed to the rear wheel. The axle is journalled in the axle bearing assembly at a point rearward of the rearward end of the swingarm and on the opposite vertical side of the swingarm from the control arm; meaning that, for example, if the control arm is above the swingarm, the axle is journalled in the axle bearing assembly at a point rearward of and below the rear end of the swingarm.

In the preferred embodiment the control arm is positioned above the swingarm and the rear axle is journalled in the axle bearing housing at a point below and behind the rear end of the swing arm.

Also in the preferred embodiment, the axle extends through the axle housing, and has affixed thereto a brake disk on the side proximal to the rear wheel hub, and a drive sprocket on the side of the axle bearing assembly distal from the wheel hub.

The axle bearing assembly may preferably include two cooperable components, an axle housing and an upright member. The wheel axle is journalled in the axle housing. The axle housing includes an externally splined cylindrical tube, which extends into an internally splined cylinder formed in the upright member, the axes of both the tube and the cylinder extending generally in a direction parallel to the swingarm. The upright member is pivotably connected to both the rear end of the swingarm and the rear end of the control arm. Locking bolts allow the splined tube of the axle housing to be secured in place within the splined cylinder of the upright member. Adjustment bolts allow the position of the splined tube to be precisely located within the splined cylinder, with the clamping bolts being temporarily loosened, so as to achieve a desired level of drive chain tension.

These and other features of the invention are more completely described by reference to the accompanying drawings and the detailed description of the invention set forth below.

BRIEF DESCRIPTION OF THE DRAWINGS

The accompanying drawings illustrate a preferred embodiment of the invention and will be understood by reference to the detailed description set forth below. In the drawings.

DETAILED DESCRIPTION OF THE INVENTION

Figure 1:
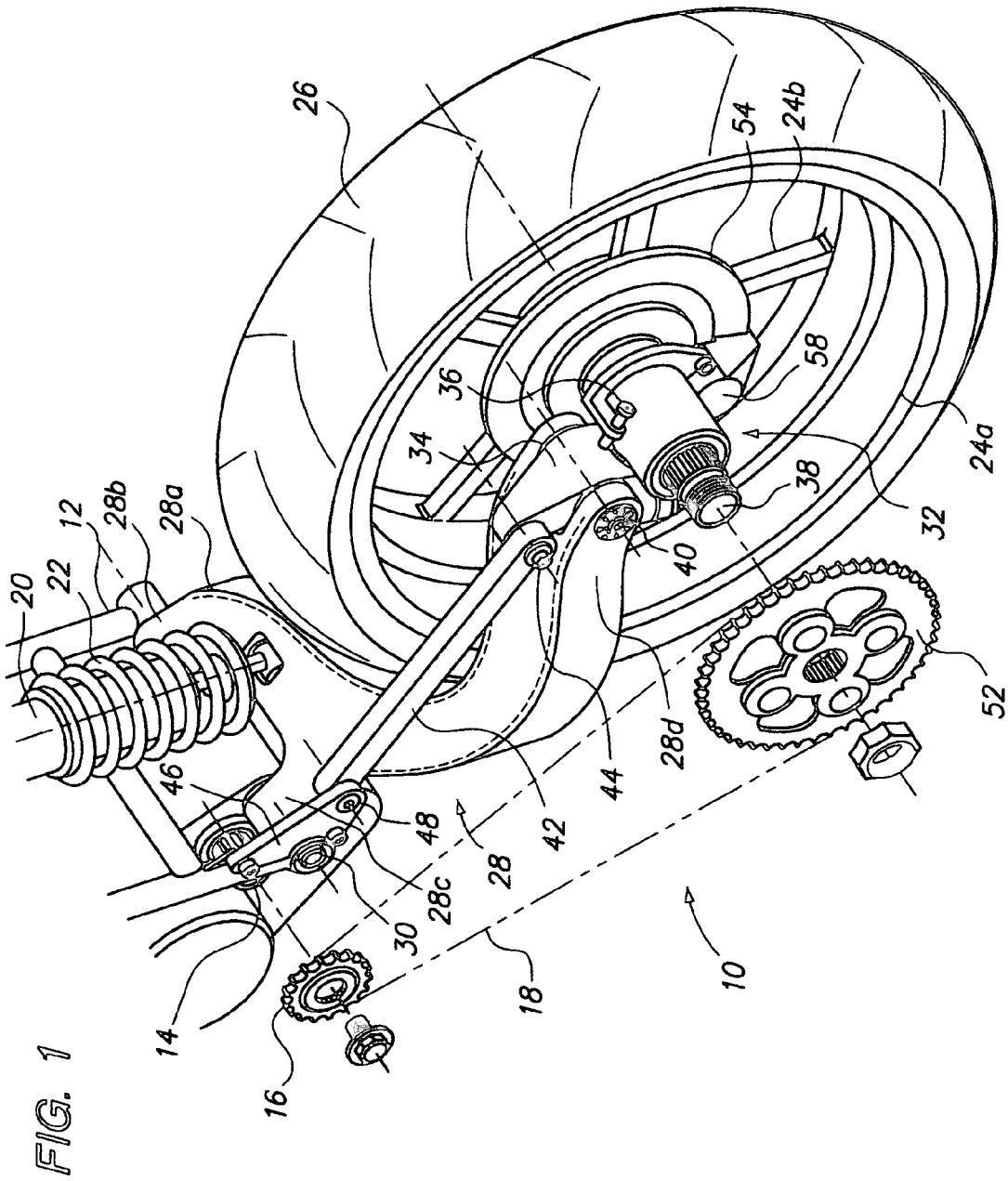
FIG. 1 is an isometric rear view of the preferred embodiment of the swingarm suspension of the present invention.

In the following detailed description and generally throughout this specification, the term "motorcycle frame" mean the main frame of a motorcycle, as well as any fixed brackets, engine components, or other elements of the motorcycle that may be utilized as a structural element and to which a weight-bearing suspension system may be attached.

Terms such as "forward," "rearward," "right-hand," "left-hand," "upper," "lower," "vertical," and "horizontal" have the ordinary meanings given to them from the perspective of a rider seated on the motorcycle and facing forward. Further in this regard, a term such as "vertical," for example, is not to be limited to the narrow meaning corresponding to the direction of the force of gravity, but means generally the direction that is perpendicular to the wheelbase of the motorcycle and parallel to the plane of symmetry of the rear tire, regardless of the actual orientation of the motorcycle, i.e., upright or tilted to one side or the other.

Referring to FIGS. 1 to 7, there is illustrated a preferred embodiment of a single-sided rear swingarm suspension 10 for a motorcycle, constructed in accordance with the present invention.

Conventional elements of the motorcycle, which constitute no part of the present invention, include a motorcycle frame 12, an engine drive shaft 14 with associated drive sprocket 16 (also known as a countersprocket), a drive chain 18, and a rear damper 20 and associated coil spring 22 which together function as a shock absorber. Also shown are the rear wheel 24, which includes an integral wheel rim 24a and a wheel hub 24b, and a tire 26 mounted on the wheel rim 24a.

Figure 2:
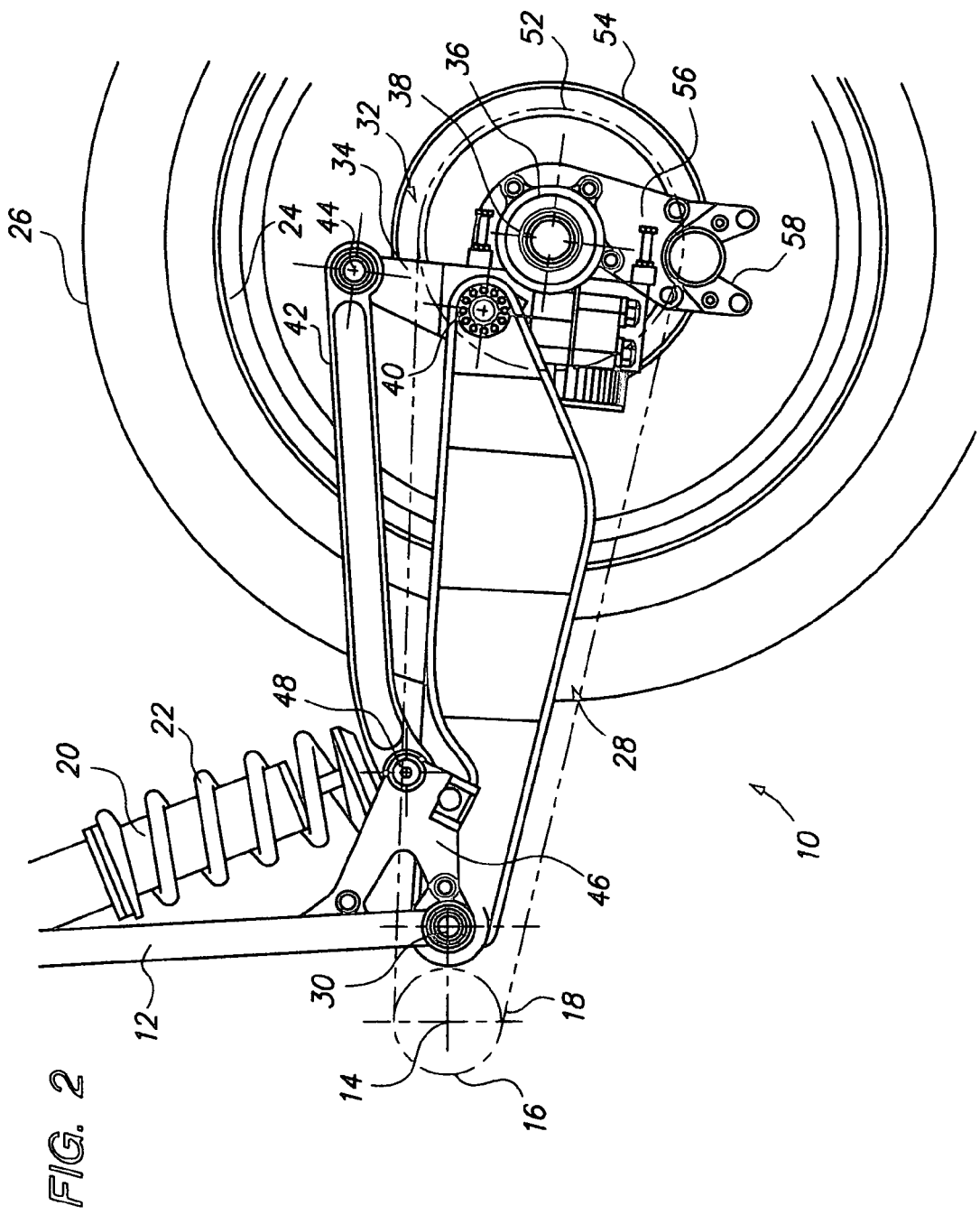
FIG. 2 is a side view of the suspension of FIG. 1.

The suspension 10 includes a single-sided rear swingarm 28 that extends rearwardly from the motorcycle and which is pivotably mounted to the motorcycle frame 12 by a horizontal swingarm pivot shaft 30 so as to swing in a vertical plane. Referring to FIG. 2, the pivot shaft 30 is located adjacent to and rearward of the drive sprocket 16. This positioning of the pivot shaft 30 of the swingarm 28 just rearward of the drive sprocket 16 has consequences related to the drive chain tension during swinging motion of the swingarm 28, as further discussed below.

The swingarm 28 is characterized as a single-sided swingarm, as opposed to a more conventional forked, or bifurcated, swingarm, because it extends along only one side of the wheel 24 and is connected to the rear wheel 24 by a cantilevered wheel axle, as described further below.

Figure 3:
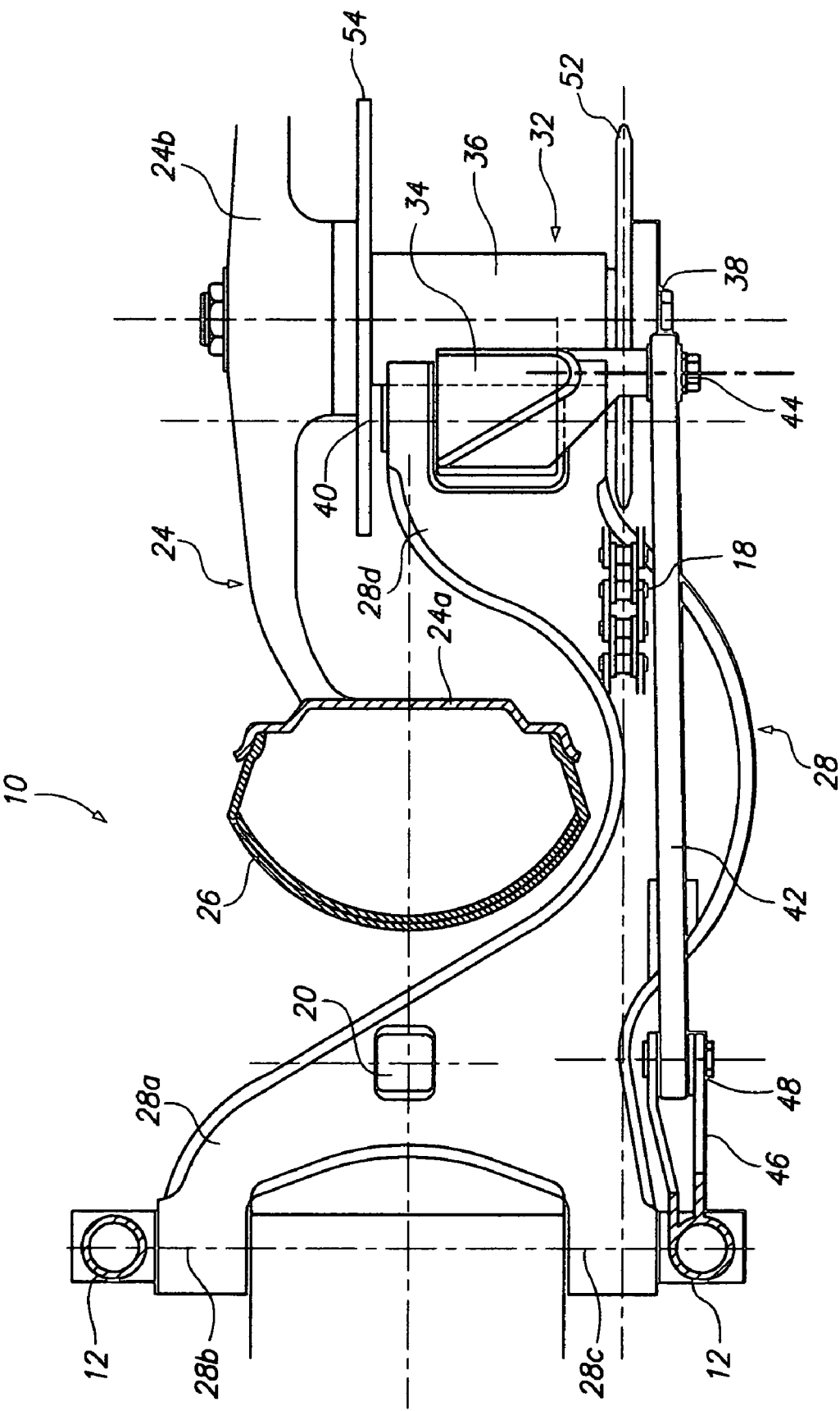
FIG. 3 is a plan view of the suspension of FIG. 1.
Figure 4:
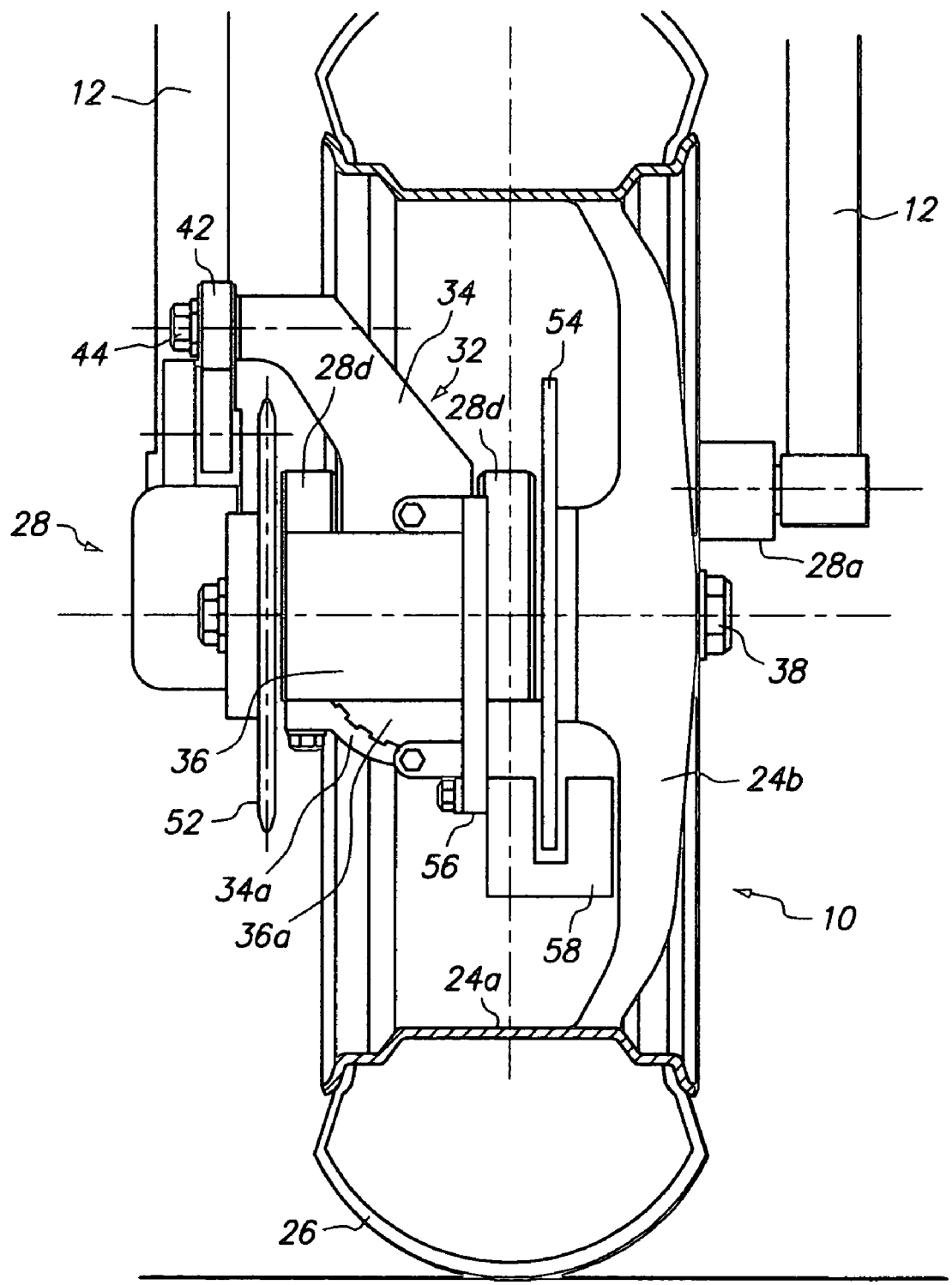
FIG. 4 is a rear end view of the suspension of FIG. 1.

Referring to the plan view in FIG. 3, the swingarm 28, when viewed from above, is generally arcuate in shape so as to curve around the wheel rim 24a and tire 26 and extend inwardly toward the wheel hub 24b. The swingarm 28 includes a wide front end 28a which is pivotably attached to the pivot shaft 30 at two spaced points by means of integral bushings 28b and 28c. The integral bushings 28b and 28c are spaced from one another on opposite sides of the motorcycle centerline, so as to provide torsional rigidity and to resist horizontal swinging motion of the swingarm 28.

It will be recognized that, while the illustrated swingarm 28 of the preferred embodiment is illustrated as being pivotably attached to a motorcycle frame, in other embodiments of the invention the swingarm 28 may be pivotably attached to the engine or to other structural elements of the motorcycle body. The swingarm 28 is connected to the damper 20 and coil spring 22 at a point forward of the wheel 24 and intermediate between the forward and rearward ends of the swingarm 28.

From its forward end 28a, the swingarm 28 extends rearwardly and curves around the motorcycle tire 26, extending partially through the loop of the drive chain 18, and curves inwardly to a point between the hub 24b of the wheel 24 and the drive chain 18. As with previously known single-sided swingarm designs in which a wheel is journalled to a cantilevered axle, the wheel hub 24b is offset to one side of the centerline of the motorcycle (to the right of the motorcycle centerline in the illustrated embodiment), so as to allow the wheel bearing assembly, discussed further below, to be located between the drive chain 18 and the hub 24b of the wheel 24, while also being close to the centerline of the motorcycle.

The rear end of the swingarm 28 terminates at and is attached to an axle bearing assembly 32 that includes an upright member 34 and an axle housing 36. As discussed in further detail below, a cantilevered rear wheel axle 38 is journalled in the axle bearing assembly 32.

More specifically, the swingarm 28 includes a bifurcated rear end 28d, within which the upright member 34 is pivotably connected by means of a horizontal pivot shaft 40 that extends through a horizontal bearing bore 34a in the upright member 34.

Referring for example to FIG. 2, the upright member 34 extends upwardly and rearwardly from the end 28d of the swingarm 28, and terminates at its upper end at the rear end of a control arm 42, to which the upper end of the upright member 34 is pivotably connected by pivot pin 44.

The control arm 42 extends generally parallel to the swingarm 28 and is located above the swingarm 28. The forward end of the control arm 42 is pivotably connected to a fixed bracket 46 by a pivot pin 48. Bracket 46 is affixed to the frame 12. The pivot pin 48 and the forward end of the control arm 42 are located at a point rearward of, and above, the swingarm pivot shaft 30. The fixed bracket 46 may also to support a conventional footpeg (not shown).

Figure 5:
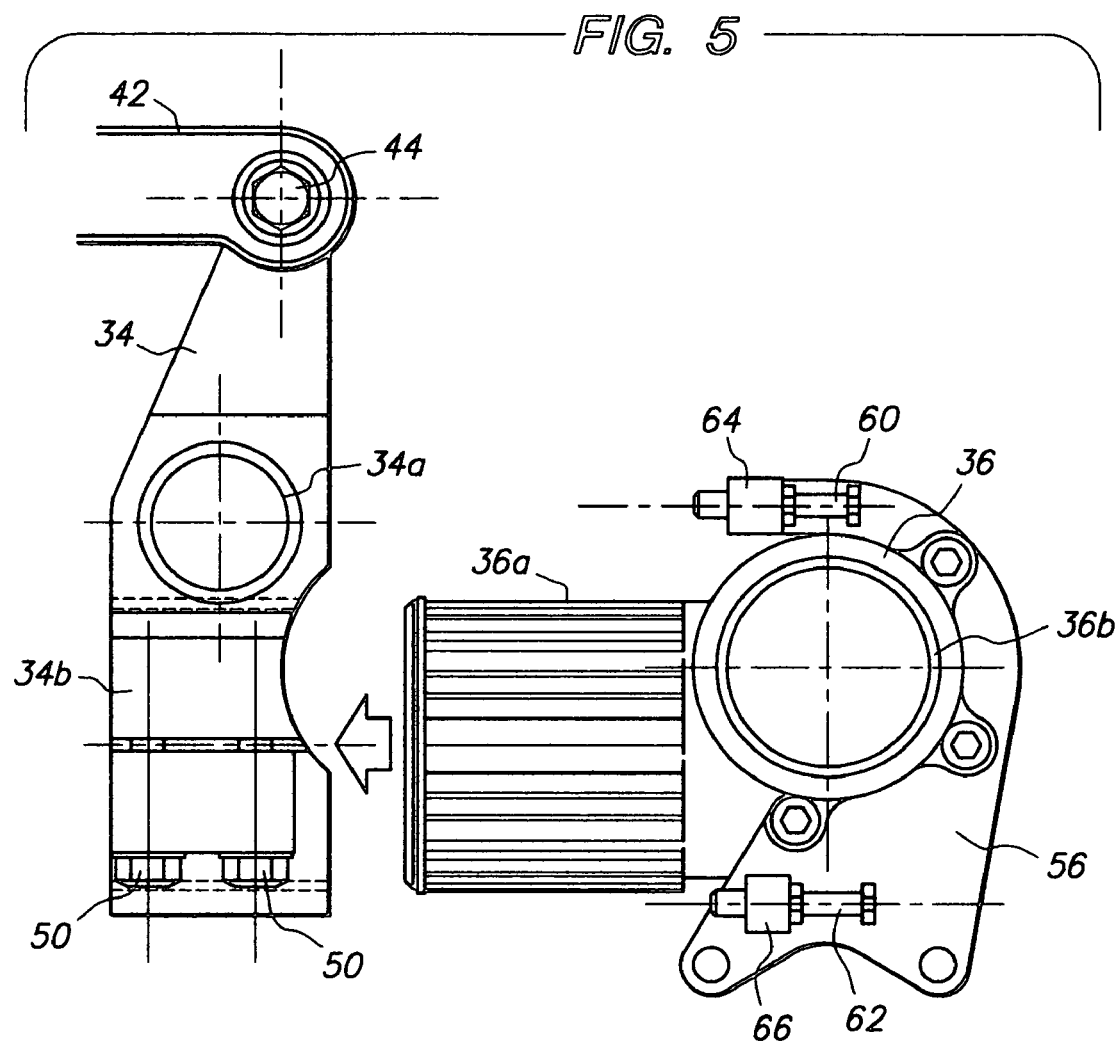
FIG. 5 is an exploded side view of the axle bearing assembly of the suspension of FIG. 1.
Figure 6:
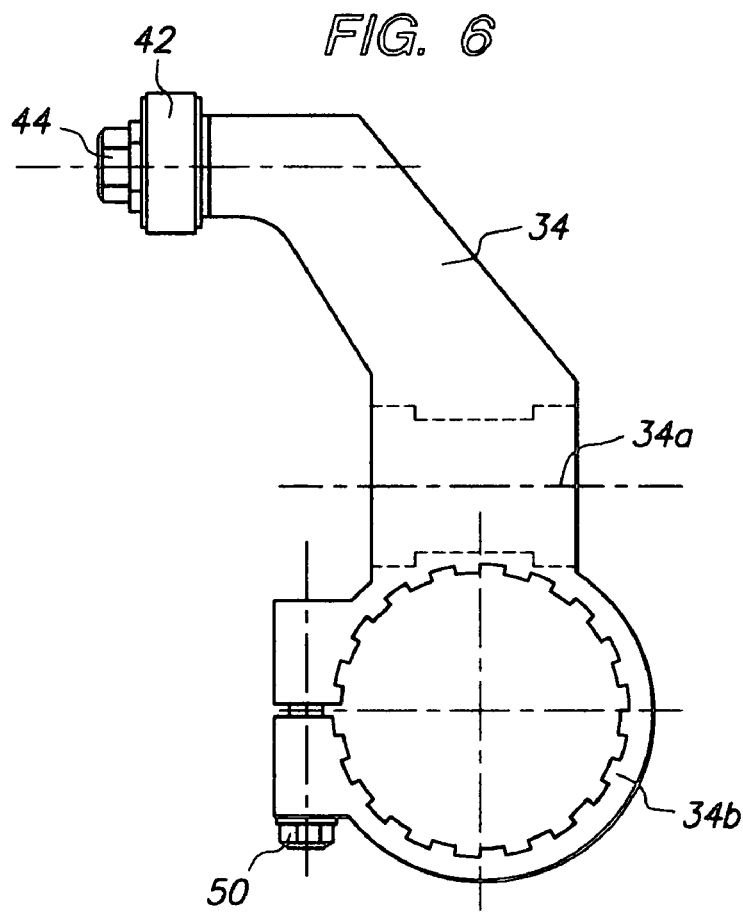
FIG. 6 is a rear view of the upright member which is part of the axle bearing assembly of FIG. 4.
Figure 7:
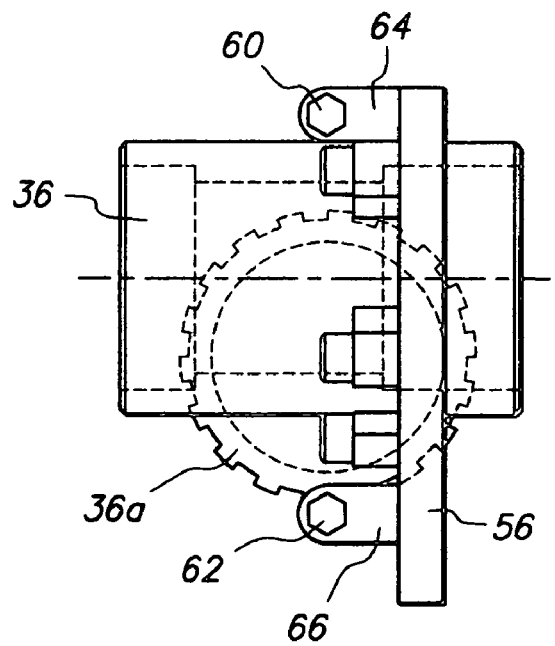
FIG. 7 is a rear view of the axle housing that is part of the axle bearing assembly of FIG. 4.

Referring particularly to FIGS. 5 through 7, the axle housing 36 includes an integral, forwardly extending, externally splined cylindrical tube 36a, which normally extends in a direction generally parallel to the swingarm 28, and which is extends into a corresponding internally splined, split tubular cylinder 34b formed in the upright member 34. The splined tube 36a of the axle housing 36 is secured immovably in the splined cylinder 34b of the upright member 34 by means of a pair of clamping bolts 50. As discussed further below, loosening the clamping bolts 50 allows the axle housing 36 to be moved forwardly or rearwardly, thereby allowing for adjustment of the tension in the drive chain 18.

As noted above, upright member 34 includes a bearing bore 34a (FIGS. 5 and 6), through which passes the pivot shaft 40 that connects the upright member 34 to the rear end 28d of the swingarm 28. The axis of the bearing bore 34a is transverse to the axis of the splined cylinder 34b, and the bearing bore 34a is located above the splined bore 32b.

The axle housing 36 further includes a horizontal, transverse axle bore 36b, in which is journalled the wheel axle 38 in appropriate bearings (not shown). The wheel axle 38 passes through and extends from both sides of the axle housing 36. A wheel sprocket 52 is affixed to the left end of the wheel axle 38 and is positioned adjacent the outer side, or left side, of the rear end 28d of the swingarm 28. The wheel sprocket 52 is engaged with the drive chain 18. The right end of the axle 38 is affixed to hub 24b of the wheel 24 and is also affixed to a brake disk 54. Brake disk 54 is positioned on the right side of the axle housing 36, between the right side of the rear end 28d of swingarm 28 and the wheel hub 24b. It will thus be noted that the wheel sprocket 52 and the brake disk 54 are located on opposite sides of the axle housing 36, with the brake disk 54 being located between the wheel hub 24b and the axle housing 36.

Affixed to the axle housing 36 is a vertically oriented caliper mounting plate 56, to which is attached a conventional hydraulic caliper brake 58, which is positioned so as to engage the brake disk 54.

The axle housing 36 also includes a pair of chain tension adjustment screws 60 and 62 (FIGS. 5 and 7), which pass through threaded bores in corresponding brackets 64 and 66, which are affixed to and extend horizontally from the caliper mounting plate 56. The chain adjustment screws 60 and 62 are located above and below the splined tube 36a, and are approximately centered on the splined tube 36a by the brackets 64 and 66. The chain adjustment screws 60 and 62 extend parallel to the axis of the splined tube 36ba and abut the rear face of the upright member 34. Rotation of the chain adjustment screws 60 and 62, with the clamping bolts 50 being loosened, permits precise longitudinal location of the splined tube 36a in the splined cylinder 34b, and thereby permits precise adjustment of the tension in the chain 18. Thereafter, tightening of the clamping bolts 50 functions to clamp the split cylinder 34b about the splined tube 36a and set the chain tension at the desired level.

It will be noted that the chain tension is thus adjusted by linear movement of the wheel axle 38 in a direction generally parallel to the axis of the swingarm 28, thereby avoiding the undesirable consequences of the eccentric chain tension adjustment mechanisms that have been commonly used in prior art single-sided swingarm assemblies.

The upper end of the upright member 34 curves outwardly over the wheel sprocket 54, so that the control arm 42 swings through a limited range of motion in a vertical plane that is parallel to the vertical plane in which the swingarm 28 swings.

It will be noted that the function of the swingarm 28 alone remains largely the same as the swingarm of a conventional swingarm suspension system. The swingarm 28, being hinged to the frame 12 and being connected to the spring 22 and damper 20, is the primary weight-bearing element of the suspension system, while the control arm 42 operates to cause the axle bearing assembly 32, including both the upright member 34 and the axle housing 36, to rotate slightly about the rear end of the swing arm 28, about pivot shaft 40, as the swingarm 28 swings up and down in response to road shocks or weight loads. This rotation of the axle bearing assembly 32 relative to the rear end of the swingarm 28 results from the length of the control arm 42 being shorter than the length of the swingarm 28, and also from the forward pivot shaft 48 of the control arm 42 being located rearward of the pivot shaft 30 of the swingarm 28. The net result is that the path traveled by the wheel axle 38 during swinging of the swingarm 28 is not a circular path traveled by the rear end of the swingarm 28, or a path concentric therewith, as is the case with prior art swingarm suspensions, but rather is a more complex path that is more nearly vertical and which thereby substantially replicates the effect of a swingarm that is longer than the combined length of the swingarm 28 and the axle bearing assembly 32. As a result of the more nearly vertical path of travel of the wheel axle 38, horizontal drive forces are more effectively isolated from the vertical forces of weight loads and road shocks.

Further, the particular suspension illustrated results in a chain tension that is more uniform over the path of travel of the swingarm than that of a comparable swingarm with a conventionally mounted rear wheel. This result is obtained because the variation in chain tension, arising from the location of the front swingarm pivot 30 rearward of the drive sprocket 16, is offset by the effect on chain tension arising from the pivoting of the axle housing assembly 32 about the rear end of the swingarm 28 during swingarm travel.

The foregoing description of a preferred embodiment of the present invention is not intended to limit the scope of the patent protection afforded the invention, and various modifications, alterations and substitutions which may be apparent to one of ordinary skill in the art may be made with departing from the present invention. Accordingly, the invention is defined solely by the following claims.

The embodiments of the invention in which patent protection is claimed are defined as follows:

1. A rear suspension for a motorcycle having a frame and a rear wheel, comprising
   a swingarm having a forward end and a rearward end, said forward end of said swingarm being pivotably connected to said frame by a swingarm pivot assembly for vertical swinging motion, and a spring and a damper connecting said frame to said swingarm at a point on said swingarm spaced rearwardly from said pivot assembly;
   an axle bearing assembly extending rearwardly from and being pivotably connected to said rearward end of said swingarm for swinging motion in a plane parallel to said plane of travel of said swingarm, said axle bearing assembly having journalled therein a cantilevered wheel axle engaged with said rear wheel;
   a control arm having forward and rearward ends and extending generally parallel to said swingarm, said control arm being shorter than said swingarm, said forward end of said control arm being pivotably connected to said frame at a point rearward of said forward end of said swingarm, said rearward end of said control arm being pivotably connected to said axle bearing assembly;
   and wherein said axle is located and journalled in said axle bearing assembly at a point rearward of said rearward end of said swingarm and on the side of said swingarm vertically opposite said control arm.

2. The rear suspension for a motorcycle defined in claim 1 wherein said control arm is located above said swingarm and wherein said axle is journalled in said axle bearing assembly at a point rearward of and below said rearward end of said swingarm.

3. The rear suspension defined in claim 2 wherein said wheel axle passes through and extends from opposite sides of said axle bearing assembly, and wherein a wheel sprocket and a brake disk are affixed to said axle on opposite sides of said axle assembly, with said brake disk being located between said axle bearing assembly and said wheel, and with said sprocket being located on the side of said axle bearing assembly distal from said wheel.

4. The rear suspension defined in claim 2 wherein said axle bearing assembly includes an upright member and an axle housing, said wheel axle being journalled in said axle housing, said upright member being pivotably connected to both said rearward end of said swingarm and said rearward end of said control arm, and wherein said axle housing includes an externally splined cylindrical tube and said upright member includes an internally splined cylinder engageable with said splined tube of said axle housing, the axes of said tube and said cylinder extending generally parallel to said swingarm.

5. The rear suspension defined in claim 4 wherein said wheel axle passes through and extends from opposite sides of said axle housing of said axle bearing assembly, and wherein a wheel sprocket and a brake disk are affixed to said axle on opposite sides of said axle housing, with said brake disk being located between said axle housing and said wheel, and with said wheel sprocket being located on the side of said axle housing distal from said wheel.

6. The rear suspension defined in claim 5 further including a brake caliper mounted to said axle housing and positioned for engagement with said brake disk.

7. The rear suspension defined in claim 5 further including a locking mechanism that allows the splined tube of the axle housing to be positioned in and secured in place as desired within said splined cylinder of said upright member so as to maintain a desired level of drive chain tension.

8. The rear suspension defined in claim 7 wherein said locking mechanism includes said internally splined cylinder of said upright member being split, and wherein said upright member includes at least one clamping bolt for clamping said split cylinder about said externally splined tube of said axle housing.

9. The rear suspension defined in claim 5 wherein said axle housing includes at least one adjustment bolt for positioning said externally splined tube of said axle housing axially within said internally splined cylinder of said upright member to thereby adjust the tension of a drive chain engaged with said sprocket.

10. The rear suspension defined in claim 5 wherein said upright member extends upwardly and curves over said wheel sprocket to the point at which said upright member is pivotably connected to said rear end of said control arm, such that said control arm extends generally parallel to said swingarm and is pivotably connected to said swingarm at a point outside of the wheel sprocket and drive chain.

11. In a motorcycle having a rear wheel and a single-sided rear swingarm having a rearward end and a forward end, said forward end being pivotably connected to a motorcycle frame so as to allow said swingarm to swing in a vertical plane of travel, the improvement comprising:

an axle bearing assembly extending rearwardly from and being pivotably connected to said rearward end of said swingarm for swinging motion in a plane parallel to said plane of travel of said swingarm, said axle bearing assembly having journalled therein a cantilevered wheel axle engaged with said wheel;

a control arm having forward and rearward ends and extending generally parallel to said swingarm, said control arm being shorter than said swingarm, said forward end of said control arm being pivotably connected to said frame at a point rearward of said forward end of said swingarm and said rearward end of said control arm being pivotably connected to said axle bearing assembly;

and wherein said axle is located and journalled in said axle bearing assembly at a point rearward of said rearward end of said swingarm and on the opposite side of said swingarm from said control arm.

12. The improvement defined in claim 11 wherein said control arm is located above said swingarm.

13. The improvement defined in claim 12 wherein said wheel axle passes through said axle bearing assembly and wherein a wheel sprocket and a brake disk are affixed to said axle on opposite sides of said axle assembly, and with said brake disk being located between said axle bearing assembly and said wheel and said sprocket being located on the side of said axle bearing assembly distal from said wheel.

14. The improvement defined in claim 13 wherein said axle bearing assembly includes an upright member and an axle housing, said wheel axle being journalled in said axle housing, said upright member being pivotably connected to said rearward end of said swingarm and said rearward end of said control arm, and wherein said axle housing includes an externally splined cylindrical tube and said upright member includes a cooperably internally splined cylinder, the axes of said tube and said cylinder extending generally parallel to said swingarm, and a locking mechanism that allows the splined tube of the axle housing to be positioned and secured in place as desired within said splined cylinder of said upright member so as to achieve a desired level of drive chain tension.

15. The improvement defined in claim 14 wherein said wheel axle passes through and extends from opposite sides of said axle housing of said axle bearing assembly, and wherein a wheel sprocket and a brake disk are affixed to said axle on opposite sides of said axle housing, with said brake disk being located between said axle housing and said wheel, and with said wheel sprocket being located on the side of said axle housing distal from said wheel.

16. The improvement defined in claim 15 further including a brake caliper mounted to said axle housing and positioned for engagement with said brake disk.

17. The improvement defined in claim 15 further including a locking mechanism that allows the splined tube of the axle housing to be positioned in and secured in place as desired within said splined cylinder of said upright member so as to maintain a desired level of drive chain tension.

18. The improvement defined in claim 17 further including a locking mechanism that allows the splined tube of the axle housing to be positioned in and secured in place as desired within said splined cylinder of said upright member so as to maintain a desired level of drive chain tension.

19. A rear swingarm assembly for a motorcycle having a frame and a rear wheel, comprising:

a swingarm having a forward end and a rearward end, said forward end of said swingarm being pivotably connected to said frame by a swingarm pivot assembly for vertical swinging motion;

an axle bearing assembly extending rearwardly from and being pivotably connected to said rearward end of said swingarm for swinging motion in a plane parallel to said plane of travel of said swingarm, said axle bearing assembly having journalled therein a cantilevered wheel axle engaged with said rear wheel;

a control arm having forward and rearward ends and extending generally parallel to said swingarm, said control arm being shorter than said swingarm, said forward end of said control arm being pivotably connected to said frame at a point rearward of said forward end of said swingarm, said rearward end of said control arm being pivotably connected to said axle bearing assembly;

and wherein said axle is located and journalled in said axle bearing assembly at a point rearward of said rearward end of said swingarm and on the side of said swingarm vertically opposite said control arm.

* * * * *